Nov. 8, 1955 W. C. BEARD, JR 2,723,055
METERING-VALVE FOR AEROSOL-SPRAY DISPENSERS
Filed Sept. 1, 1950 2 Sheets-Sheet 1

Walter C. Beard, Jr.
Inventor
By
Seymour, Earle & Nichols
Attorneys

Nov. 8, 1955  W. C. BEARD, JR  2,723,055
METERING-VALVE FOR AEROSOL-SPRAY DISPENSERS
Filed Sept. 1, 1950  2 Sheets-Sheet 2
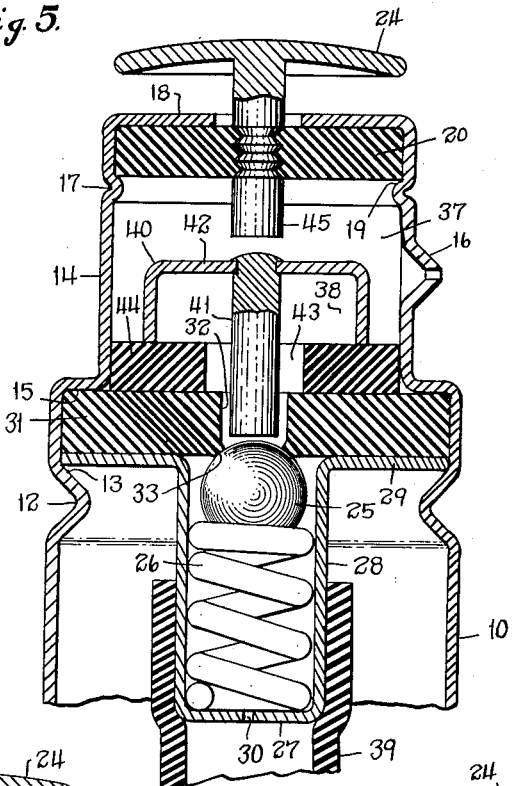
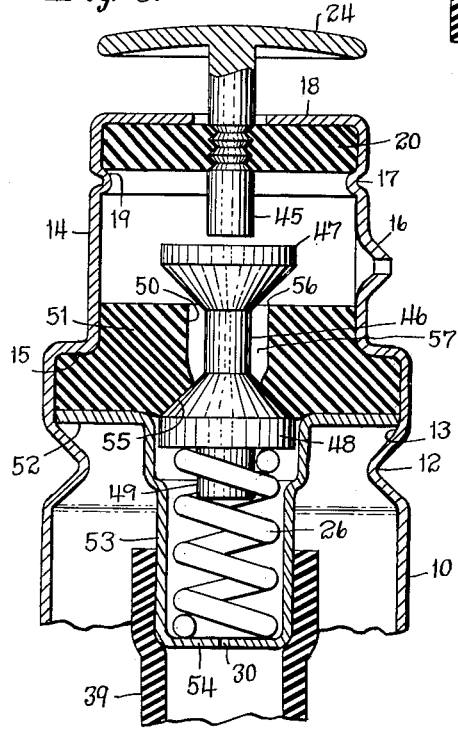
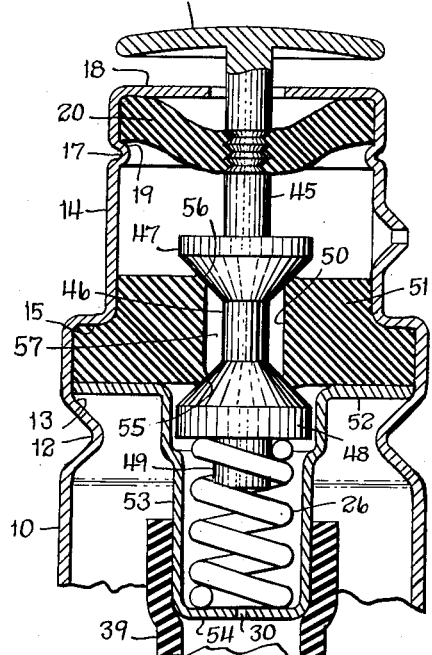
Walter C. Beard, Jr.
Inventor
By Seymour, Earle + Nichols
Attorneys

United States Patent Office 2,723,055
Patented Nov. 8, 1955

2,723,055

METERING-VALVE FOR AEROSOL-SPRAY DISPENSERS

Walter C. Beard, Jr., Litchfield, Conn., assignor to The Risdon Manufacturing Company, Naugatuck, Conn., a corporation of Connecticut Application September 1, 1950, Serial No. 182,859

6 Claims. (Cl. 222—394)

The present invention relates in general to dispensers and more especially to a dispenser of the type which utilizes fluid pressure for expelling a liquid medium into the atmosphere in the form of a fine mist or aerosol spray, the invention pertaining in particular to improved metering valve means for successively effecting the emission of predetermined quantities of the aerosol spray from the dispenser.

An object of the invention is to provide a superior metering valve means for a liquid spray dispenser.

A further object of the invention is to provide a liquid-spray dispenser with superior metering valve means of durable, economical and dependable construction.

A still further object of the invention is to provide a liquid spray dispenser with improved metering valve means for successively effecting the release of a predetermined charge of a liquid medium from the dispenser, the metering valve means serving also to effect a diminution in the size of the particles of the liquid so as to form an aerosol spray.

Other objects and advantages will appear to those skilled in the art from the following, considered in conjunction with the accompanying drawings.

In the accompanying drawings, in which certain modes of carrying out the present invention are shown for illustrative purposes:

Fig. 5 is an enlarged fragmentary side elevation of the dispenser showing another form which the metering valve means may assume in accordance with the present invention, the valve being closed;

Fig. 6 is an enlarged fragmentary side elevation in section of a dispenser embodying still another form of metering valve means, the valve being closed and the metering chamber open; and Fig. 7 is similar to Fig. 6, but with both the valve and metering chamber closed.

Figure 1:
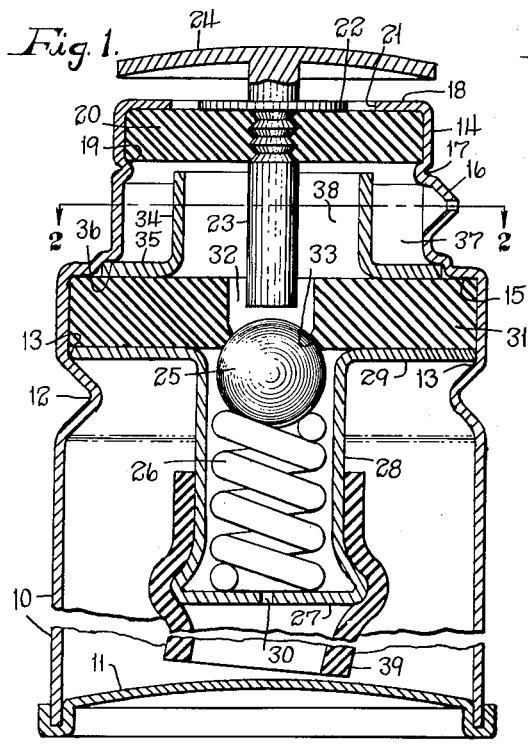
Fig. 1 is an enlarged broken side elevation in section of an aerosol dispenser embodying the improved metering valve means of this invention, the valve being in its closed position.
Figure 2:
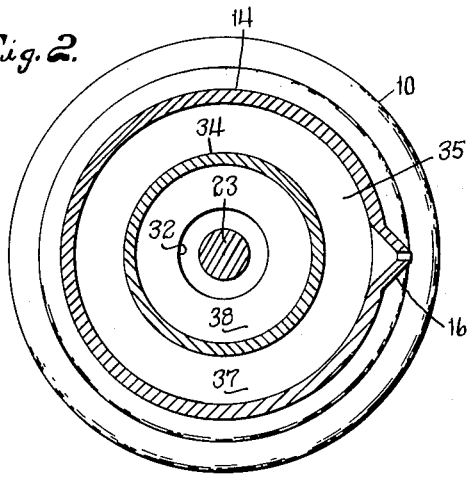
Fig. 2 is a transverse section of the dispenser on line 2—2 of Fig. 1.

*The showing of Figs. 1 through 4*

Referring to Figs. 1 through 4, the fluid pressure operated dispenser shown therein for illustrating the metering valve means of this invention comprises a substantially cylindrical main body portion 10, the lower end of which is provided with an end closure member 11, preferably of concavo-convex construction, and permanently secured to the lower edge of the body 10 by crimping the edge of the end closure member 11 thereover.

Adjacent the upper end of the body portion 10 of the dispenser is an annular external indenture 12 which provides an annular shoulder 13 on the inner wall of the dispenser for supporting elements of the valve means, as and in the manner hereinafter described.

The upper end of the dispenser comprises an inverted cup shaped cap portion 16 of reduced diameter, which is preferably although not necessarily integral therewith. The bottom end of the cap portion 14 comprises a radial flange which forms a substantially square, annular, internal shoulder 15 with the upper end of the body portion 10 of the dispenser, the internal shoulder 15 being spaced above the annular internal shoulder 13 for accommodating a resilient diaphragm therebetween as described below. Extending outwardly radially from one wall of the dispenser cap 14 is a substantially conical protuberance 16 which has an aperture therethrough and serves as the valve nozzle of the dispenser. Moreover, the cap portion 14 of the dispenser is provided with an annular external indenture 17 at a predetermined distance below its upper end or top wall 18, so as to provide an inner annular shoulder 19 within the cap portion of the dispenser. The annular shoulder 19 serves to support the outer peripheral edge of a resilient outlet passage closing element in the form of a disk shaped diaphragm 20 formed of rubber or a rubber-like material, the periphery of which is adapted normally to make a substantially fluid tight seal with the under face of the top wall 18 of the dispenser cap 14.

Figure 3:
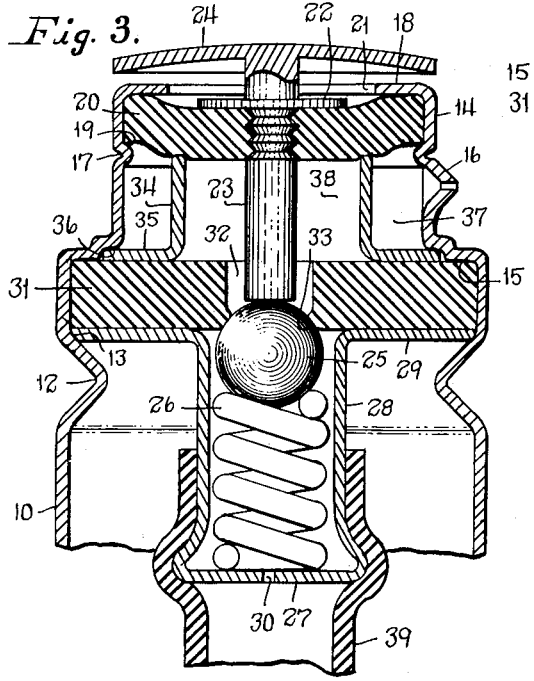
Fig. 3 is an enlarged fragmentary side elevation in section similar to Fig. 1, but with both the metering chamber and the valve closed.
Figure 4:
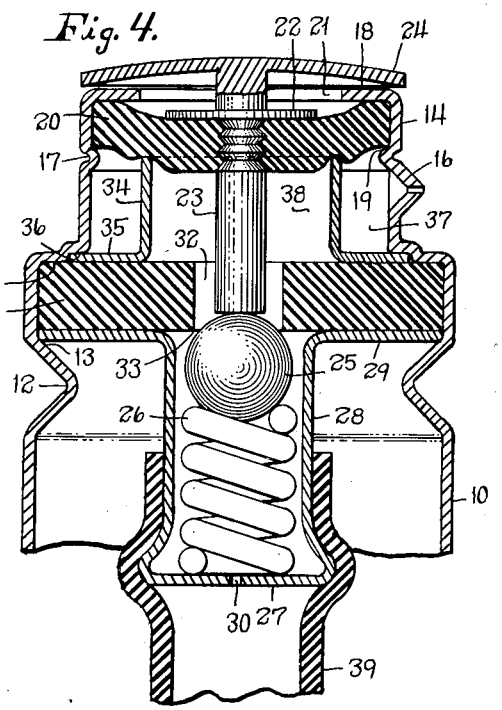
Fig. 4 is a view of the dispenser similar to Fig. 3, but showing the metering chamber of the valve means closed and the valve open.

As indicated in Figs. 3 and 4, the latter is provided with a concentric aperture 21 for accommodating a disk shaped diaphragm operating metal flange 22 which lies in a plane substantially at right angles to the longitudinal axis of the shank of a valve operating stem 23; and which is secured thereto immediately below an operating head 24 on the upper end of the latter, the diameter of the diaphragm operating flange 22 being less than the diameter of the aperture 21 in the top wall 18 of the dispenser cap. The diaphragm operating flange 22 is adapted to seat on the upper face of the aforesaid resilient diaphragm 20 to support the valve operating stem substantially vertically in a central aperture of the diaphragm through which the valve stem projects, the valve stem being secured in the central aperture of the diaphragm against axial movement relative thereto by providing annular serrations in the wall thereof and in the adjacent portion of the valve stem.

The valve operating stem is thus supported normally in the dispenser cap 14 with the lower end of the valve operating stem immediately above the valve which, in the instance shown, comprises a spherical ball 25 supported on the upper end of a valve spring 26 which comprises preferably a coil spring supported at its lower end on the bottom 27 of a spring supporting casing 28. The spring supporting casing is circumambient to the valve spring 26 and ball valve 25, the upper end of the spring supporting casing being provided with an integral, annular, radially projecting flange 29 which is substantially at right angles to the longitudinal axis of the casing. The diameter of the flange 29 is only slightly less than the inside diameter of the upper end of the dispenser body 10 and is thus adapted to be supported therein by seating on the aforesaid inner annular shoulder 13 of the indenture 12, in the manner shown in Figs. 1, 3 and 4. Formed in the bottom 27 of the spring supporting casing 28 is an axial aperture 30 for the passage of fluid under pressure therethrough from the body of the dispenser up into the spring casing.

A substantially fluid tight seal is made between the spring supporting casing and the cap portion 14 of the dispenser by means of a second resilient disk shaped diaphragm 31, which is also formed of rubber or a rubber-like material and is supported on the upper face of the flange 29 between the latter and the aforesaid inner annular shoulder 15 of the dispenser. The thickness of the diaphragm 31 and its outside diameter are such that the diaphragm fits snugly between the upper face of the flange 29 and the inner annular shoulder 15 thereby to hold the flange 29 of the spring supporting casing on the shoulder 13 of the dispenser body 10; and simultaneously to form a fluid tight seal with the wall of the can. An axial aperture 32 is provided at the center of the resilient diaphragm 31 to accommodate the lower end of the valve stem, the diameter of the aperture being greater than the diameter of the valve stem but less than the major diameter of the spherical ball valve 25. The annular bottom edge 33 of the aforesaid central aperture 32 of the diaphragm 31 thus constitutes a valve seat against which the ball valve is normally engaged by the resilient force of the coil spring, to preclude the emission of fluid under pressure from the lower portion of the dispenser up into its cap portion 14. The spring supporting casing, valve spring, ball valve, valve stem and resilient diaphragms are hereinafter referred to as the valve means of the dispenser. Also, the space forming the passageway or route between the ball valve and the discharge nozzle by which the fluid in the main portion of the dispenser gets to the nozzle is hereinafter termed the outlet passage.

The metering mechanism of the dispenser is disposed in the outlet passage and all fluid emerging from the main body portion of the dispenser is caused to pass therethrough. This metering mechanism includes a collar 34 located between the upper and lower diaphragms 20 and 31 respectively of the dispenser and all fluid released by the valve 25 passes interiorly through this collar which is cooperatively associated with said upper and lower diaphragms 20 and 31 of the dispenser, as hereinafter described, to provide a metered discharge of fluid from the dispenser. To these ends, the collar 34 is provided with a radial flange 35 at its lower end projecting substantially at right angles thereto, the diameter of the annular flange being such that its peripheral edge engages against the inner walls of the adjacent end of the dispenser cap. Preferably, the peripheral edge of the flange is adapted to engage beneath the shoulder 36 of an annular recess formed in the wall of the cap portion of the dispenser immediately above the upper face of the diaphragm 31, whereby the flanged collar is positively held thereagainst.

In its illustrated form, the diameter of the flanged collar 34 is substantially half the diameter of the cap portion 14 of the dispenser, whereby the collar forms an outer annular chamber 37 with the inner wall of the dispenser cap and an inner annular chamber 38, which is concentric therewith and through which passes the valve stem 23. As shown in Fig. 1, the over-all height of the flanged collar 34 is somewhat less than the vertical distance between the upper and lower diaphragms 20 and 31 respectively of the dispenser, whereby the upper edge of the flanged collar and the underside of the upper diaphragm 20 are normally spaced apart, for the purpose hereinafter described.

The metering valve means hereinabove described is connected with the liquid in the lower regions of the can body by means of a flexible tube 39, the upper end of which is stretched over the lower flared end of the spring supporting casing 28 and the lower end of which is suspended freely adjacent the bottom of the can.

*The operation of the showing of Figs. 1 through 4*

Let it be assumed that the dispenser is charged with a solution or an emulsion, as the case may be, comprising the liquid medium to be dispensed such as, for example, an antiseptic, grease, resins, waxes, dyes, paints, etc.; and an expelling agent comprising one of the highly volatile liquified gases of the fluorochloromethane and ethane groups such as, for example, Freon, having a vapor pressure of from 35 to 45 lbs. per square inch under normal room temperature conditions. With the elements of the metering mechanism in their related positions as shown in Fig. 1, the highly volatile fluid within the dispenser is sealed therein by engagement of the ball valve 25 against the valve seat 33 of the diaphragm 31, the ball valve being held against its valve seat both by the force of the compressed valve spring 26 and the vapor pressure of the fluid within the dispenser. Upon pressing downwardly on the head 24 of the valve stem 23, the latter is moved downwardly relative to the dispenser cap 14, thereby deflecting the upper resilient diaphragm 20 downwardly in the manner indicated in Fig. 3, to bring the bottom face of the latter into sealing engagement with the upper edge of the flanged collar 34, the downward deflection of the upper diaphragm 20 being insured by engagement of the flange 22 of the valve stem therewith. After the upper diaphragm has formed a fluid tight seal with the upper edge of the flanged collar 34, additional downward movement of the valve stem 23 brings the lower end of the latter into engagement with the ball valve 25 and forces it downwardly against the resistance of the valve spring 26 and the fluid pressure within the dispenser, off of its valve seat 33 as indicated in Fig. 4, thereby opening the discharge passage 32 in the center of the lower diaphragm 31 for the escape of fluid under pressure from the lower regions of the dispenser up through the feed tube 39 into the chamber 38 of the collar 34 (Fig. 4). Since the latter is sealed at its upper end, the fluid in the chamber 38 is not free to escape through the nozzle 16 into the atmosphere. Initially upon releasing the head 24 of the valve stem 23, the force of the compressed valve spring 26, acting in conjunction with the fluid pressure within the dispenser, will move the ball valve 25 upwardly into sealing engagement with its valve seat 33, thereby cutting off the discharge passage 32 from the lower regions of the dispenser. However, the initial upward displacement of the valve stem 23 is insufficient to withdraw the upper diaphragm 20 from sealing engagement with the upper edge of the flanged collar 34. Consequently, a measured charge of fluid under pressure is momentarily confined within the sealed chamber 38. However, since the valve stem 23 has been released, the fluid pressure within the sealed chamber 38 will subsequently force the upper diaphragm 20 upwardly out of engagement with the upper edge of the flanged collar 34 to its normal position as shown in Fig. 1, whereupon the fluid within the chamber 38 is free to escape over the upper edge thereof into the annular chamber 37 and from thence through the nozzle 16 to the atmosphere. The quantity of fluid which escapes from the nozzle 16 of the dispenser thus corresponds to the quantity of fluid originally confined within the sealed chamber 38 and is thus determined by the size of such chamber. It will be clear, therefore, that irrespective of how long the valve is held open, only a predetermined or metered quantity of fluid will be discharged from the dispenser nozzle with each successive release of the valve stem, i. e., for each completed cycle of operation of the valve actuating member.

*The showing of Fig. 5*

In the showing of Fig. 5, certain of the parts correspond to those previously described and have reference characters applied thereto which correspond to those previously used.

In the dispenser of Fig. 5, the only material change in structure over that shown in the preceding figures and hereinabove described, is in the metering mechanism. In this form of the invention, the metering mechanism comprises an inverted cup shaped element 40 provided with a valve stem extension 41, the upper end of which is rigidly secured by peening or an equivalent manner to the center of the top end wall 42 of the metering cup 40. The outside diameter of the metering cup is considerably less than the inside diameter of the dispenser cap 14 so as to provide an annular chamber 37 therein. Moreover, the height of the metering cup is considerably less than the vertical distance between the diaphragm 20 and the auxiliary diaphragm 44, so as to permit the metering cup to have freedom of movement vertically therebetween. The lower end of the valve stem extension 41 is adapted to extend down through a substantially central aperture 43 of a resilient annular seat member 44 which is formed of rubber or a rubber-like material and mounted upon the upper face of the lower diaphragm 31 of the dispenser. The seat member 44 corresponds in diameter substantially to the inside diameter of the cap portion 14 of the dispenser so as to form a snug fit therein, and hence provide a substantially stable supporting surface upon which the lower open edge of the metering cup rests. In the preferred construction, the diameter of the central aperture 43 of the seat member 44 is greater than that of the central aperture 32 of the lower diaphragm 31.

As in the preceding valve structure, the lower edge of the central aperture 32 of the bottom diaphragm 31 constitutes a valve seat 33 against which the ball valve 25 is normally urged by the force of the valve spring 26.

The manually operated means for actuating the valve is similar to that hereinabove described and includes an upper resilient diaphragm 20 having a central aperture in which a valve stem 45 is secured against longitudinal movement relative thereto by means of interlocking serrations or equivalent fastening means, the upper end of the valve stem 45 being provided with a manually operated head 24. With the elements of the metering mechanism in their normal related positions as shown in Fig. 5, the lower end of the valve stem 45 is spaced immediately above the upper peened-over end of the valve stem extension 41 of the metering cup, while the lower end of the valve stem extension 41 is spaced immediately above the peripheral surface of the ball valve, the spacing between the latter and the lower end of the valve stem extension 41 being less than the spacing between its upper peened-over end and the lower end of the valve stem 45.

*Operation of the showing of Fig. 5*

Assuming that the dispenser is charged with a highly volatile fluid of the type hereinabove described and that the elements of the metering mechanism are in their normal positions as shown in Fig. 5, then upon depressing the head 24 of the valve stem 45, the upper diaphragm 20 will be deflected downwardly, thereby permitting the lower end of the valve stem 45 to engage against the upper peened-over end of the valve stem extension 41 of the metering cup 40, thereby positively holding the bottom edge thereof firmly against the upper surface of the seat member 44, so as to form a fluid tight seal therebetween. Continued downward pressure on the head 24 of the valve stem 45 will thereafter force the bottom edge of the metering cup 40 down into the resilient seat member 44 sufficiently to bring the lower end of the valve stem extension 41 into engagement with the ball valve 25 and move the latter downwardly off of its valve seat 33. Thereupon, the highly volatile fluid under pressure within the dispenser passes up through the feed tube 39 into the discharge passage 32 of the lower diaphragm 31 and the discharge passage 43 of the seat member 44 into the metering cup 40, wherein it is confined by the fluid tight seal formed between the lower edge of the metering cup and the upper face of the seat member 44. Initially, upon releasing the head 24 of the valve stem 45, the force of the compressed fluid within the body of the dispenser plus the force of the compressed valve spring will reseat the ball valve. The metering cup 40 will, however, at this time still be held momentarily in sealing engagement with the seat member 44 by engagement of the lower end of the valve stem 45 with the upper end of the valve stem extension. However, since the valve stem has been released, it will be subsequently carried up into its uppermost position by the return of the diaphragm 20 to its normal position in the cap, and hence the pressure of the fluid momentarily confined within the metering cup 40 will move the latter upwardly away from the seat member 44, thereby breaking the seal between the latter and the lower edge of the metering cup. Hence, the metered charge of fluid within the cup escapes beneath the lower edge of the latter into the annular chamber 37 of the cap portion 14 of the dispenser and from thence to the atmosphere through its valve nozzle 16. Thus, irrespective of how long the valve is held open, only a metered charge of the volatile fluid will be discharged from the dispenser following each successive release of the valve stem.

*The showing of Figs. 6 and 7 inclusive*

In the showing of Figs. 6 and 7, certain of the parts correspond to those previously described herein and have reference characters applied thereto which correspond to those previously employed.

In the form of the invention shown in Figs. 6 and 7, the metering mechanism is again designed to provide for the dispersion of a metered charge of fluid from the dispenser, and to this end the metering mechanism is incorporated in the valve and comprises a substantially spool shaped element consisting of a central stem portion 46 provided at its opposite ends respectively with substantially frusto-conical enlargements 47 and 48 respectively, the lower frusto-conical enlargement 48 being provided on its bottom face with a depending protuberance or spring pilot 49. The aforesaid metering spool is adapted to be assembled in the central aperture or discharge passage 50 of a relatively-thick resilient diaphragm or annular seat member 51 formed of rubber or a rubber-like material and supported securely in sealing engagement with the upper end of the body portion of the dispenser by the radial flange 52 of a spring supporting casing 53 which, in turn, is supported on the inner annular shoulder 13 of the dispenser body 10. The spring supporting casing is provided with an apertured bottom 54 against which the lower end of the coiled valve spring 26 engages, the upper end of the spring casing 53 being provided with an annular enlargement for accommodating the frusto-conical enlargement 48 of the metering spool. The latter is adapted normally to engage against a valve seat 55 which constitutes the bottom edge or inner end of the discharge passage 50 in the diaphragm 51 to form a fluid tight seal therewith, in the manner shown in Fig. 6. Moreover, the relationship between the two frusto-conical enlargements of the spool valve and the upper and lower edges of the discharge passage 50 is such that normally, that is to say, with the frusto-conical enlargement 48 of the metering spool held against the valve seat 55 of the diaphragm 51 by the force of the coil spring 26 and the fluid pressure within the container, the upper frusto-conical enlargement 47 of the metering spool is spaced above the upper edge 56 of the discharge passage 50 of the diaphragm, the lower end of the valve stem 45 being spaced immediately above the top face of the frusto-conical enlargement 47 of the metering spool.

*Operation of the showing of Figs. 6 and 7*

To operate the metering mechanism of this form of the invention, the head 24 of the valve stem is pushed down in the manner shown in Fig. 7, thereby deflecting the upper diaphragm 20 and bringing the lower end of the valve stem 45 into engagement with the top face of the upper frusto-conical enlargement 47 of the valve and metering spool, whereby the latter is moved downwardly in the discharge passage 50 of the diaphragm 51, the downward movement of the valve and metering spool being accomplished against the resistance of the coil spring 26 and the force of the compressed highly volatile fluid within the lower regions of the dispenser, both of which act against the underside of the lower frusto-conical enlargement 48 of the spool. As the latter is moved downwardly, the upper frusto-conical enlargement 47 of the spool is moved into engagement with the upper edge 56 of the discharge passage 50 of the diaphragm to close off the upper end thereof. Simultaneously, the lower frusto-conical enlargement 48 is moved downwardly relative to the valve seat 55 at the lower end of the discharge passage 50 of the diaphragm. However, the slope of the frusto-conical enlargement 48 is so related to the diameter of the valve seat 55 at the lower end of the discharge passage 50 that the frusto-conical enlargement 48 remains in sealing engagement with its valve seat 55 even while the upper frusto-conical enlargement 47 forms a fluid tight seal with the upper edge 56 of the discharge passage 50. The position of the metering spool under the latter circumstances is illustrated in Fig. 7, from which it will be apparent that the upper and lower frusto-conical enlargements of the metering spool momentarily seal off an annular chamber 57 within the discharge passage 50 of the diaphragm 51, as and for the purpose hereinafter described.

Upon forcing the head 24 of the valve stem downwardly further, the frusto-conical enlargement 48 of the measuring spool is moved to a position below the lower valve seat 55 of the diaphragm 51, thereby permitting the highly volatile fluid under pressure within the lower regions of the dispenser to flow up into the chamber 57, which is still sealed at its upper end by engagement of the frusto-conical enlargement 47 with the upper edge 56 thereof. Thereafter, upon the initial release of the head 24 of the valve stem, the latter is urged upwardly by the return of the displaced diaphragm 20 to its normal position as shown in Fig. 6. As the force applied on the spool by the valve stem to hold the spool in its lowermost position is withdrawn, the force of the compressed valve spring 26, augmented by the force of the fluid pressure within the dispenser, urges the metering spool upwardly to engage its frusto-conical enlargement 48 with the valve seat 55 of the diaphragm 51, thereby closing the lower end of the chamber 57. The upper frusto-conical enlargement 47 is, however, still in contact with the upper edge 56 of the discharge passage 50, and hence the latter is momentarily sealed at each end in the manner shown in Fig. 7. A metered charge of the highly volatile fluid is thus momentarily confined in the passage or chamber 57. Thereafter, the forces exerted by the compressed spring and fluid pressure on the lower end of the spool cause the latter to be moved upwardly further into its normal uppermost position, as shown in Fig. 6, wherein the upper frusto-conical enlargement 47 is moved up out of engagement with the upper edge 56 of the chamber 57, whereby the latter is opened and releases the metered charge into the upper part of the cap portion of the dispenser, from which the charge is dispersed through the valve nozzle 16. Thus, irrespective of how long the valve is held open, only a predetermined charge of fluid will be accumulated within the metering chamber for dispersion to the atmosphere upon release of the valve stem.

It will be appreciated that in each form of the invention illustrated herein, the flow of highly volatile fluid from the lower regions of the dispenser to the valve nozzle 16 is by way of the feed tube 39 through the relatively small aperture 30 in the bottom of the spring supporting casing, and from the casing through a relatively narrow discharge passage of the lower diaphragm into a relatively large chamber from which the fluid escapes through the valve nozzle 16 to the atmosphere. Thus, the highly volatile fluid is subjected to forces tending both to mechanically break up the particles of fluid, and to effect a sudden relatively violent expansion of the fluid, whereby the fluid is broken up into minute particles and emitted from the nozzle in the form of a very finely divided or aerosol spray. It will be appreciated, moreover, that the metering valve means shown herein may be augmented by additional diffusing means for improving the fineness of the aerosol spray.

The provision of metering mechanism in conjunction with the valve means of the dispenser, makes it possible to successively effect the release of predetermined charges of a liquid medium from the dispenser, irrespective of how long the valve operating head is held down, and consequently a considerable saving of the contents of the dispenser is automatically accomplished without mental effort.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a dispenser having a cap portion and a nozzle, the combination including: valve means mounted in the cap portion of said dispenser, said valve means including a normally closed valve arranged to hold a fluid under pressure within said dispenser, and a valve operating member arranged to open said valve to dispense a measured quantity of fluid directly from said dispenser to the atmosphere by way of said nozzle; and fluid metering means comprising an inverted cup shaped member cooperatively associated with said valve means, said cup shaped member being arranged to effect a seal around the periphery of its open end by actuating said valve operating member to open said valve so as to permit a measured quantity of fluid to enter from said valve into said cup shaped member and to be retained thereby, said cup shaped member being arranged to be unsealed upon release of said valve operating member and the concurrent closing of said valve to permit the measured quantity of fluid in said cup shaped member to escape therefrom for discharge at the nozzle of said dispenser.

2. In a dispenser having a main body portion, a cap portion and a nozzle, the combination including: valve means mounted in the cap portion of said dispenser; an outlet passage leading from said main body portion to said cap portion and nozzle, said valve means being disposed in said outlet passage and comprising a ball valve arranged normally to close one end of said outlet passage to hold a fluid under pressure within said dispenser, and a valve operating member arranged to move said ball valve away from the said end of said outlet passage to release the fluid from said dispenser into said outlet passage; and fluid metering means comprising an inverted cup shaped member and a resilient diaphragm upon which said cup shaped member rests in an inverted position, the latter being cooperatively associated with said valve operating member to effect a seal by engagement of its rim with said resilient diaphragm upon actuating said valve operating member to open said ball valve so as to permit a measured quantity only of fluid to enter into said inverted cup shaped member from said dispenser, and to release said seal upon release of said valve operating member and the concurrent closing of said ball valve to permit the measured quantity of fluid within said inverted cup shaped member to escape through the nozzle of said dispenser.

3. In a dispenser having a main body portion, a cap portion and a nozzle, the combination including: valve means mounted in the cap portion of said dispenser; an outlet passage leading from said main body portion to said cap portion and nozzle, said valve means being disposed in said outlet passage and comprising a spool valve having a frusto-conical enlargement on its lower end arranged normally to close one end of said outlet passage to hold a fluid under pressure within said dispenser, and a valve operating member arranged to move the frusto-conical enlargement on the lower end of said spool valve away from the lower end of said outlet passage to release a fluid under pressure from said dispenser into said outlet passage; and fluid metering means comprising a frusto-conical enlargement on the upper end of said spool valve and a resilient annular seat member with which said upper frusto-conical enlargement is adapted to engage and to form a seal upon actuating said valve operating member to open the lower end of said outlet passage thus permitting a quantity of fluid to enter into said outlet passage from said dispenser, and to release said seal upon release of said valve operating member and the concurrent closing of the lower end of said outlet passage to permit said quantity of fluid within said outlet passage to escape through the nozzle of said dispenser.

4. In a dispenser having a main body portion, a cap portion and a nozzle therein for discharging a fluid under pressure the combination including: valve means arranged to hold a fluid under pressure within the main body portion of said dispenser and upon actuation to effect dispensing of a measured quantity of fluid directly from said dispenser by way of said nozzle; means for actuating said valve means; and fluid metering means cooperatively associated with said valve means and interposed between the latter and said nozzle, said metering means being adapted and arranged to prevent discharge of fluid from said nozzle whenever said actuating means is moved to its actuating position but to allow any fluid in said metering means to discharge from said nozzle whenever said actuating means is in its unactuating position.

5. In a dispenser having a main body portion, a cap portion and a nozzle therein for discharging a fluid under pressure, the combination which comprises: an outlet passage leading from said main body portion to said nozzle, valve means disposed within said passage and including a valve arranged normally to close said outlet passage at a first point to hold fluid under pressure within said dispenser, and a valve operating member arranged to open said valve at said first point to effect a release of fluid thereat; and fluid metering means comprising an outlet passage closing element arranged to positively close said outlet passage at a point spaced from said first point whenever said valve operating member is moved to its valve opening position, whereby only a measured quantity of fluid, as determined by the size of the outlet passage between said spaced points, is discharged directly from said dispenser upon each completed cycle of operation of said valve operating member.

6. In a dispenser having a main body portion, a cap portion and a nozzle therein, the combination including: valve means mounted in the cap portion of said dispenser; an outlet passage leading from said main body portion to said cap portion and nozzle; said valve means being disposed in said outlet passage and comprising a ball valve arranged normally to close one end of said outlet passage to hold a fluid under pressure within said dispenser, and a valve operating member arranged to move said ball valve away from said end of said outlet passage to release fluid into the latter; and fluid metering means comprising a collar through which the fluid passes upon release by said valve, and a resilient diaphragm cooperatively associated with said valve operating member and adapted to form a seal at the end of said collar farthest from said valve upon actuating said valve operating member to open said ball valve, whereby fluid fills said collar but is prevented from escaping therefrom; said resilient diaphragm being moved out of sealing engagement with said collar only after said ball valve has been reseated upon return movement of said valve operating member, thus permitting the measured quantity of fluid within said collar to escape for discharge at the nozzle of said dispenser.

References Cited in the file of this patent

UNITED STATES PATENTS

| | | |
|---|---|---|
| 1,186,181 | Gage | June 6, 1916 |
| 2,014,652 | Jones | Sept. 17, 1935 |
| 2,106,649 | Officer | Jan. 25, 1938 |
| 2,506,449 | Greenwood | May 2, 1950 |